S. S. WYLY.
AMMONIA ABSORBER.
APPLICATION FILED OCT. 24, 1910.

984,729.

Patented Feb. 21, 1911.

WITNESSES:
D. E. Neibel
Luke C. Hinton.

INVENTOR.
Samuel S. Wyly,
BY
George W. Hinton
ATTORNEY.

THE NORRIS PETERS CO., WASHINGTON, D. C.

UNITED STATES PATENT OFFICE.

SAMUEL S. WYLY, OF ST. JOSEPH, MISSOURI.

AMMONIA-ABSORBER.

984,729.  Specification of Letters Patent. Patented Feb. 21, 1911.

Application filed October 24, 1910. Serial No. 588,904.

*To all whom it may concern:*

Be it known that I, SAMUEL S. WYLY, a citizen of the United States, residing at St. Joseph, in the county of Buchanan and State of Missouri, have invented certain new and useful Improvements in Ammonia-Absorbers, of which the following is a specification, reference being had therein to the accompanying drawing.

My invention relates to improvements in ammonia absorbers, for use in ammonia absorption refrigerating systems, and the objects of my improvements are to provide an absorber of this class which can be made of such simple standard parts as are now found regularly in the market, and to so arrange said parts that the coldest water used therein (as the same enters said absorber) shall absorb heat from the coolest portion of the aqua ammonia, used therein, as the same is passing from said absorber, and finally the thus most highly heated water shall absorb heat from the incoming and hottest portion of said aqua ammonia, thereby absorbing the maximum amount of heat from said aqua ammonia into the minimum amount of said water. The above operation is what is well known as the counter current method of cooling and is by far the most efficient method, and produces the lowest possible temperature, in the liquid or gas being cooled thereby, and the further objects of my invention are to apply this counter current principle of cooling aqua ammonia by constructing a simple substantial durable and efficient device for mixing ammoniacal gas with said aqua ammonia and at the same time cooling said mixtures as above described.

Still further objects are to so construct and arrange the parts of an ammonia absorber that the water pipes thereof can be easily and quickly opened for cleaning the same, without in any way disturbing or loosening the joints of the ammonia retaining parts.

Other objects are to construct an absorber of this class of detachably connected sections of such arrangement that other and similar sections may at any time be added thereto or taken therefrom or be disconnected therefrom for cleaning or repairing the same, one at a time, while the remainder of said sections are in use, to provide controlling means, whereby the amount of ammoniacal gas admitted into each of said sections is independently regulated and controlled, to so proportion and shape the parts of said sections, that the same shall be easy to assemble or separate, and shall occupy the minimum amount of floor space.

Figure 1:
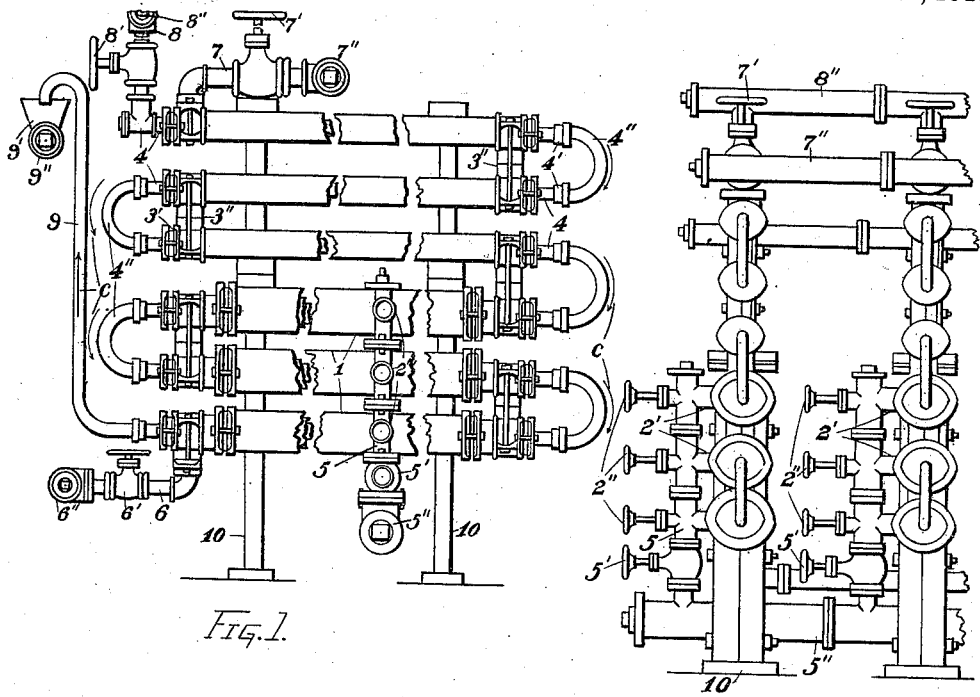
Figure 2:
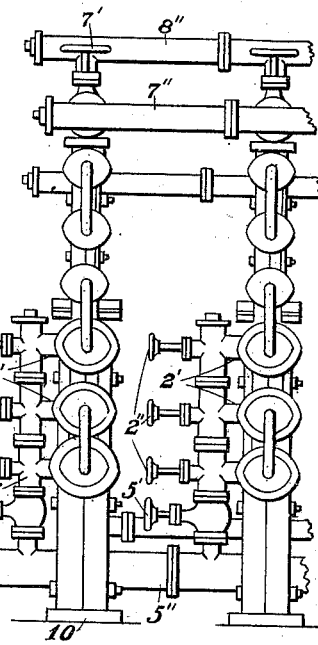
Figure 3:
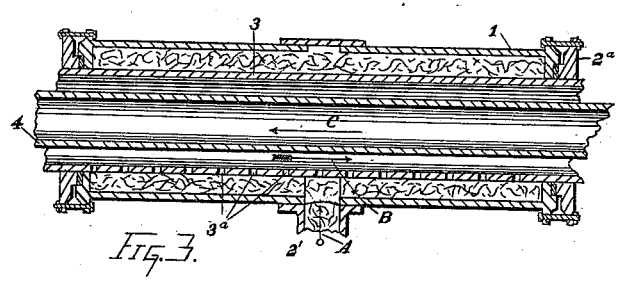
Figure 4:
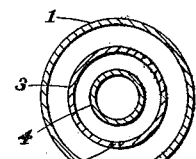
Figure 5:
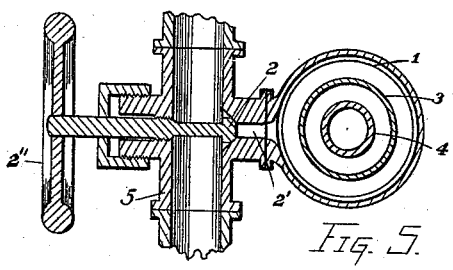

I attain these objects by the mechanism illustrated in the accompanying drawing, in which:

Figure 1 is a side elevation of a section of the absorber. Fig. 2 is an end view of two of such sections as are seen in Fig. 1. Fig. 3 is an enlarged longitudinal section, cut horizontally through the center of one of the gas pipes and a portion of its aqua ammonia pipe and its water pipe. Fig. 4 is a transverse section on the line X X seen in Fig. 3, looking toward the right. Fig. 5 is a transverse section of the parts seen in Fig. 4, cut vertically through the center and looking toward the left.

My invention comprises the outside or ammonical gas pipe 1, provided with valve 2 operated by hand wheel 2″ for regulating flow of gas into said pipe through inlet valve opening 2′. Said pipe is also provided with glands $2^a$, one at each end thereof, for forming gas tight closing means therefor around pipe 3. Pipe 3 has a row or plurality of small annular apertures $3^a$ formed through the bottom side thereof, for placing the interiors of pipe 1 and aqua ammonia pipe 3 in communication with each other. Said pipe 3 is provided with glands 3′, one at each end thereof for closing said ends around water pipe 4, and since said pipes 3 and 4 are used in series or coils composed of a plurality of any desired number of said pipes the ends of pipes 3 are connected by the well known return bend connections 3″, while the ends of water pipes 4 are connected by the unions 4′ and return bends 4″. Ammoniacal gas pipes 1 may be used singly or a plurality of any desired number of said pipes may be used, the same being connected in multiple as seen in Figs. 1 and 2. The amount of ammoniacal gas admitted into each of said pipes 1 is independently regulated by the previously described valves 2, provided with inlet 5, having inlet gas valve 5′ therein and connected with gas inlet header 5″, leading to other parts of an ordinary refrigerating system, not shown, and connected therewith in the manner usual in such systems. The described coil of aqua ammonia pipes 3 is provided with inlet pipe 6, in like manner having valve 6' therein and being connected with header 6'', connected similarly to header 5''.

The described coil of water pipes 4 are provided with inlet 8, valve 8' and with header 8'', leading to the water supply, not shown. Said coil of pipes 4 are also provided with outlet pipe 9, adapted to discharge water into catch basin 9' connected with and leading into discharge header 9'', and said pipes are supported on stands or frames 10.

In operation the ammoniacal gas, the aqua ammonia and the water for cooling the same, are caused to flow in the directions indicated by arrows A, B and C respectively, by moving means, which form no part of my invention, and are therefore neither shown nor described. Said gas passes through inlets 5 into gas pipes 1 and thence through apertures $1^a$ into aqua ammonia pipes 3 and is absorbed by the aqua ammonia in said pipes. The heat generated by the chemical union of said gas and ammonia is absorbed therefrom by water in pipes 4. It will be understood that the pressure of said ammoniacal gas is much higher in pipes 1 and all of the gas piping connected therewith, than the pressure of said aqua ammonia in pipes 3 and their aqua ammonia piping. This excessive pressure of gas prevents said aqua ammonia in pipes 3 from passing therefrom through apertures $1^a$ into pipes 1. While said absorber is in operation said pressure of gas is continually maintained by devices which form no part of my invention and are therefore neither shown nor described. Should said pressure of gas at any time be lower than the pressure of said aqua ammonia, as in installing the absorber, or when from any cause the operations of the previously mentioned refrigerating system are stopped, it is evident that said aqua ammonia would gravitate from pipes 3, through apertures $1^a$ into pipes 1 and fill the same. It will also be understood that when said pressure of gas is applied as stated, the same will force said aqua ammonia from pipes 1, through apertures $1^a$ into pipes 3, after which the described gas absorbing operation takes place.

It will be seen that the upper pipes of the described coils are not provided with pipes 1; the same are used only as cooling coils, for cooling the described mixture of gas and ammonia from whence said mixture passes through outlet pipe 7 and header 7'' to parts previously mentioned. These upper pipes when considered separately from the lower ones, are old and are generally in use, known as the counter-current two pipe condenser. The addition of the pipe 1 to the lower one of the pipes of such a condenser, the provision of gas-tight closing means for the ends of said pipe 1, and the perforation or forming of apertures through the pipe 3 provide the herein described absorber.

By closing the valves 5', 6', 7' and 8' of any given section said section can be removed without stopping the operation of any other similar section of pipes, or the same may be repaired or the water pipes 4 of the same may readily be cleaned by removing unions 4' and return bends 4'', thus leaving both ends of pipes 4 open for insertion of an ordinary scraper or swab. Thus every facility is afforded for the cleaning of pipes 4.

Having fully described my invention, what I claim as new and desire to secure by Letters Patent is:

1. In an ammonia absorber, an ammonia pipe adapted to conduct aqua ammonia under pressure therethrough; a water pipe extending longitudinally throughout the entire length of the interior of said ammonia pipe, through the central portion thereof and adapted to conduct water therethrough for absorbing heat from said ammonia; a gas pipe surrounding the major portion of said ammonia pipe and having a space therein adapted to hold ammoniacal gas therein under pressure between the interior of said gas pipe and the exterior of said ammonia pipe, said ammonia pipe having a plurality of apertures formed therethrough whereby the interiors of said gas and ammonia pipes are placed in communication; an inlet pipe adapted to admit gas into said gas pipe and controlling means whereby said inlet is controlled.

2. In an ammonia absorber, the combination of a plurality of gas pipes adapted to hold gas therein under pressure, with a like plurality of ammonia pipes, said gas pipes being each provided with a gas inlet, and gas controlling means, whereby said inlets are separately and independently controlled, together with communicating means whereby the interiors of said gas pipes and said ammonia pipes are placed in communication with each other.

3. In an ammonia absorber in combination, a water inlet header and a water discharge header; an aqua ammonia header and an aqua ammonia outlet header; an ammoniacal gas header; a plurality of pipe sections; stands for supporting said sections; each of said sections comprising a coil of water pipes, a coil of aqua ammonia pipes, through the central portions of which said water pipes are longitudinally extended, said ammonia pipes being adapted to have aqua ammonia under pressure passed therethrough, a plurality of gas pipes, adapted to hold ammoniacal gas therein each of said gas pipes surrounding the major portion of one of said ammonia pipes and having a space therein adapted to hold ammoniacal gas under pressure between the interior of said gas pipe and the exterior of said ammonia pipe, said ammonia pipe having a plurality of apertures formed therethrough whereby the interiors of said pipes are placed in communication with each other; inlet means for admitting gas from said gas header; closing means whereby said inlet means is closed and independent closing means for closing independently the inlet of each of said gas pipes; closable communicating means for each of said sections and said headers, whereby the several coils of ammonia pipes and of water pipes are respectively and independently connected with their respective headers and independent closing means for each of said communicating means.

In testimony whereof I affix my signature in the presence of two witnesses.

SAMUEL S. WYLY.

Witnesses:
JOHN J. HINTON,
LUKE E. HINTON.